US012719869B2

(12) United States Patent
Ponnuru et al.

(10) Patent No.: US 12,719,869 B2
(45) Date of Patent: Aug. 25, 2026

(54) MULTI-TENANT SECRETS MANAGER

(71) Applicant: Dell Products L.P., Round Rock, TX (US)

(72) Inventors: Viswanath Ponnuru, Bangalore (IN); Vinay Sawal, Fremont, CA (US); Sumanth Vidyadhara, Bangalore (IN); Judith A. Furlong, Natick, MA (US)

(73) Assignee: Dell Products L.P., Round Rock, TX (US)

( * ) Notice: Subject to any disclaimer, the term of this patent is extended or adjusted under 35 U.S.C. 154(b) by 91 days.

(21) Appl. No.: 18/417,341

(22) Filed: Jan. 19, 2024

(65) Prior Publication Data

US 2025/0240293 A1 Jul. 24, 2025

(51) Int. Cl.

| | |
|---|---|
| ***H04L 9/40*** | (2022.01) |
| ***G06F 21/57*** | (2013.01) |
| ***G06F 21/74*** | (2013.01) |
| *G06F 9/455* | (2018.01) |
| *G06F 9/50* | (2006.01) |

(Continued)

(52) U.S. Cl.

CPC .............. *H04L 63/10* (2013.01); *G06F 21/57* (2013.01); *G06F 21/74* (2013.01); *H04L 63/08* (2013.01); *G06F 9/455* (2013.01); *G06F 9/50* (2013.01); *G06F 21/53* (2013.01); *H04L 9/0825* (2013.01); *H04L 9/3268* (2013.01); *H04L 63/0272* (2013.01); *H04L 63/105* (2013.01); *H04L 67/1097* (2013.01)

(58) Field of Classification Search

None

See application file for complete search history.

(56) References Cited

U.S. PATENT DOCUMENTS 6,185,683 B1 * 2/2001 Ginter ..................... G07F 9/026 705/52
7,650,505 B1 * 1/2010 Masurkar ................ H04L 67/02 713/176

(Continued)

FOREIGN PATENT DOCUMENTS

CN 116204269 A * 6/2023 ........... H04L 63/104
WO WO-2024123351 A1 * 6/2024 ........... H04L 63/104

OTHER PUBLICATIONS

Google Patents Translation of CN116204269, pp. 1-10 (Year: 2023).*

(Continued)

*Primary Examiner* — Luu T Pham
*Assistant Examiner* — James J Wilcox
(74) *Attorney, Agent, or Firm* — Workman Nydegger

(57) ABSTRACT

One example method includes receiving, by a confidential container service from a tenant, a request to provision a tenant node, provisioning the tenant node using a multi-tenant trusted execution environment (TEE) attested resource provisioning process, receiving, from the tenant, tenant-specific security information concerning the tenant node, storing the tenant-specific security information in a tenant-specific catalog, implementing security procedures, specified in the tenant-specific security information, in the tenant node, and upon successful authentication of the tenant, using the security procedures, enabling the tenant to access the tenant specific confidential resources from the tenant node(s).

14 Claims, 4 Drawing Sheets

(51) Int. Cl.

| | |
|---|---|
| *G06F 21/53* | (2013.01) |
| *H04L 9/08* | (2006.01) |
| *H04L 9/32* | (2006.01) |
| *H04L 67/1097* | (2022.01) |

(56) References Cited

U.S. PATENT DOCUMENTS 7,685,430 B1 * 3/2010 Masurkar ............ H04L 63/1466 380/255
7,730,523 B1 * 6/2010 Masurkar .............. H04L 63/168 726/4
8,615,400 B2 * 12/2013 Laventman ........ G06Q 30/0283 705/7.11
9,003,141 B2 * 4/2015 Nielsen ................... G06F 11/20 718/1
9,154,296 B1 * 10/2015 O'Connell ............ H04L 9/0861
9,398,016 B1 * 7/2016 Chakraborty ........... H04L 63/20
9,405,902 B1 * 8/2016 Xavier ................ H04L 63/1441
9,471,353 B1 * 10/2016 Christopher ........ G06F 9/45504
9,503,452 B1 * 11/2016 Kumar ................ H04L 63/0838
9,509,698 B2 * 11/2016 He .......................... H04L 47/70
9,703,611 B1 * 7/2017 Christopher .......... G06F 9/5027
9,772,835 B1 * 9/2017 Trautmann .............. G06F 9/547
9,954,936 B2 * 4/2018 Khalaf ................ H04L 12/4641
9,992,186 B1 * 6/2018 Drozd .................. H04L 63/102
10,009,337 B1 * 6/2018 Fischer ............... H04L 67/1097
10,044,723 B1 * 8/2018 Fischer ................. H04L 63/102
10,063,380 B2 * 8/2018 Brandwine ........... H04L 9/3263
10,168,949 B1 * 1/2019 Abdul Rasheed ...... G06F 3/065
10,289,325 B1 * 5/2019 Bono ...................... G06F 3/067
10,332,084 B2 * 6/2019 Bulumulla ............. G06Q 30/06
10,341,355 B1 * 7/2019 Niemoller ............. H04L 63/104
10,379,818 B2 * 8/2019 Jensen ...................... G06F 8/70
10,644,890 B1 * 5/2020 Peddada ............... H04L 9/0894
10,749,689 B1 * 8/2020 Peddada ............... H04L 9/0894
10,776,503 B2 * 9/2020 Porter ................. G06F 21/6245
10,855,619 B1 * 12/2020 Andrews ................. H04L 63/20
10,958,662 B1 * 3/2021 Sole .................... H04L 63/0853
11,038,897 B1 * 6/2021 Wilson .................. H04L 63/107
11,134,058 B1 * 9/2021 Sole ...................... G06F 21/554
11,178,188 B1 * 11/2021 Wu ........................ H04L 63/20
11,184,403 B1 * 11/2021 Wu ......................... H04L 67/10
11,212,171 B1 * 12/2021 Ozkan ..................... G06F 9/453
11,240,110 B1 * 2/2022 Narula ................ H04L 41/5064
11,271,973 B1 * 3/2022 Ravi ....................... H04L 41/22
11,303,633 B1 * 4/2022 Williams .............. H04L 63/083
11,303,647 B1 * 4/2022 Wu ....................... H04L 63/105
11,327,992 B1 * 5/2022 Batsakis ............... H04L 63/083
11,405,369 B1 * 8/2022 Retyunskiy ........... H04L 9/3263
11,457,040 B1 * 9/2022 Sole ...................... H04L 63/101
11,580,239 B2 * 2/2023 Carroll, Jr. .......... G06F 21/6218
11,601,434 B1 * 3/2023 Hornsby ............... H04L 63/029
11,700,190 B2 * 7/2023 Yadav ................... H04W 72/54 718/1
11,799,861 B2 * 10/2023 Pieczul ................... H04L 67/06
11,863,390 B1 * 1/2024 Menes .................. H04L 45/488
11,882,117 B1 * 1/2024 Kumar ................ H04L 63/0853
11,989,592 B1 * 5/2024 Kulkarni ............. H04L 63/0853
12,015,721 B1 * 6/2024 Kumar .................. H04L 9/3263
12,413,409 B2 * 9/2025 Mukherjee ............ H04L 9/3271
12,437,113 B1 * 10/2025 Dahme .................. G06N 20/00
12,524,262 B1 * 1/2026 Alkhalifa ............ G06F 9/45558
2005/0182956 A1 * 8/2005 Ginter ..................... H04L 63/08 375/E7.009
2009/0288084 A1 * 11/2009 Astete .................... G06Q 30/02 718/1
2010/0250497 A1 * 9/2010 Redlich .................. G06Q 10/06 707/661
2011/0302415 A1 * 12/2011 Ahmad ................... H04L 63/08 713/168
2012/0174113 A1 * 7/2012 Pohlmann ............. G06F 9/5088 718/104
2012/0297183 A1 * 11/2012 Mukkara ............... H04L 9/0894 713/153
2014/0090037 A1 * 3/2014 Singh .................. H04L 63/0815 726/8
2014/0096182 A1 * 4/2014 Smith ................. H04L 63/0853 726/1
2014/0108789 A1 * 4/2014 Phatak ................ H04L 63/0823 713/168
2014/0173060 A1 * 6/2014 Jubran .................. G06F 9/5061 709/220
2014/0208100 A1 * 7/2014 Kendall .............. G06F 21/6281 713/187
2014/0215590 A1 * 7/2014 Brand ................... G06F 9/5072 726/6
2014/0237580 A1 * 8/2014 Kato ....................... H04L 63/08 726/9
2014/0250511 A1 * 9/2014 Kendall .................. G06F 21/44 726/6
2014/0281531 A1 * 9/2014 Phegade ............. G06F 9/45558 713/168
2014/0380429 A1 * 12/2014 Matsugashita ...... H04L 63/0884 726/4
2015/0006730 A1 * 1/2015 Helfman ................. H04L 47/83 709/226
2015/0120818 A1 * 4/2015 Kim ........................ G06F 21/00 709/203
2015/0135275 A1 * 5/2015 Matsugashita ........ H04L 63/104 726/4
2015/0180863 A1 * 6/2015 Kobayashi ............. H04L 47/70 726/9
2015/0229645 A1 * 8/2015 Keith .................. H04W 12/086 726/4
2015/0237041 A1 * 8/2015 Flamini ............... H04L 63/0823 726/10
2015/0256341 A1 * 9/2015 Ye .......................... H04L 9/321 713/164
2015/0319160 A1 * 11/2015 Ferguson ................ H04L 63/12 726/10
2015/0319192 A1 * 11/2015 Cabrera .................. H04L 63/10 726/1
2015/0373004 A1 * 12/2015 Hopkins ................. H04L 67/02 726/6
2016/0021181 A1 * 1/2016 Ianakiev ................ G06Q 10/10 709/204
2016/0028833 A1 * 1/2016 Georgieva ............ G06F 16/955 709/228
2016/0044035 A1 * 2/2016 Huang .................. H04L 9/3073 726/4
2016/0072895 A1 * 3/2016 Bailey ................. H04L 67/1095 709/228
2016/0094583 A1 * 3/2016 Bower .................... H04L 63/20 726/1
2016/0105393 A1 * 4/2016 Thakkar .................. H04L 67/10 709/220
2016/0156671 A1 * 6/2016 Cabrera .................. H04L 63/20 726/1
2016/0205091 A1 * 7/2016 Matsuda ................. H04W 4/60 726/7
2017/0155655 A1 * 6/2017 Spaulding ............... G06F 21/62
2017/0171201 A1 * 6/2017 Matsugashita .......... H04L 63/20
2017/0237812 A1 * 8/2017 Sutardja ................ H04L 67/563 709/217
2017/0250892 A1 * 8/2017 Cooper ................. G06F 21/552
2017/0257266 A1 * 9/2017 Cai ..................... H04L 61/5014
2017/0264643 A1 * 9/2017 Bhuiyan ............. G06F 16/9024
2017/0278100 A1 * 9/2017 Kraemer ........... G06Q 20/3678
2017/0279611 A1 * 9/2017 Kraemer .............. G06Q 20/065
2017/0300309 A1 * 10/2017 Berger ..................... H04L 63/20
2017/0329943 A1 * 11/2017 Choi ................... H04L 63/0428
2017/0331802 A1 * 11/2017 Keshava ............... H04L 9/0894
2017/0331832 A1 * 11/2017 Lander .................. H04L 63/102
2017/0374136 A1 * 12/2017 Ringdahl ............... G06F 9/5077
2018/0007051 A1 * 1/2018 Vij .......................... G06F 21/10
2018/0039494 A1 * 2/2018 Lander ................ G06F 11/3688
2018/0041515 A1 * 2/2018 Gupta ...................... G06F 21/53
2018/0041598 A1 * 2/2018 Vats ...................... H04L 63/104
2018/0063123 A1 * 3/2018 Tempel ................. H04L 63/045
2018/0081668 A1 * 3/2018 Eberlein ............. H04L 63/0807
2018/0083826 A1 * 3/2018 Wilson ................ H04L 63/0815

(56) References Cited

U.S. PATENT DOCUMENTS

2018/0083915 A1* 3/2018 Medam .................. H04L 61/10
2018/0083944 A1* 3/2018 Vats .................... H04L 63/0815
2018/0083967 A1* 3/2018 Subramanian .......... H04L 63/10
2018/0130168 A1* 5/2018 Nayshtut ................ G06V 20/80
2018/0212966 A1* 7/2018 Costa ..................... H04L 63/10
2018/0212971 A1* 7/2018 Costa .................... H04L 63/101
2018/0302430 A1* 10/2018 Israel ..................... G06Q 50/01
2018/0337914 A1* 11/2018 Mohamad Abdul ........................ H04L 9/3213
2018/0351958 A1* 12/2018 Sakurai ............... H04L 63/0884
2018/0375838 A1* 12/2018 Hersans .............. G06F 21/6218
2019/0005454 A1* 1/2019 Hilckox ................ H04L 63/108
2019/0007494 A1* 1/2019 Mani .................. H04L 41/5048
2019/0042319 A1* 2/2019 Sood ....................... G06F 21/74
2019/0042783 A1* 2/2019 Guim Bernat ........ H04L 9/0894
2019/0058709 A1* 2/2019 Kempf .................... G06F 21/64
2019/0065278 A1* 2/2019 Jeuk ...................... G06F 9/5077
2019/0068606 A1* 2/2019 Xiao ....................... H04L 51/18
2019/0098055 A1* 3/2019 Pitre ...................... H04L 63/20
2019/0098056 A1* 3/2019 Pitre ................... G06F 21/6218
2019/0102162 A1* 4/2019 Pitre ................... H04L 41/5048
2019/0109852 A1* 4/2019 Ranganathan ...... G06F 21/6218
2019/0121960 A1* 4/2019 Brown .................... G06F 21/74
2019/0141536 A1* 5/2019 Bachmutsky ........... H04L 67/10
2019/0149531 A1* 5/2019 Kakumani .............. H04L 63/08 726/1
2019/0149579 A1* 5/2019 Kakumani .......... H04L 63/0876 726/1
2019/0253419 A1* 8/2019 De Wever ............... H04L 63/10
2019/0253457 A1* 8/2019 Koul ....................... H04L 63/20
2019/0286502 A1* 9/2019 Chang ..................... H04L 67/56
2019/0286812 A1* 9/2019 Lounsberry ........... H04L 63/062
2019/0286813 A1* 9/2019 Lounsberry ........... H04L 9/0894
2019/0288995 A1* 9/2019 Bose ....................... H04L 63/20
2019/0349194 A1* 11/2019 Fan ....................... H04L 9/0891
2019/0377694 A1* 12/2019 Muthukrishnan ... G06F 12/1458
2019/0394204 A1* 12/2019 Bansal .................... G06F 21/41
2020/0007530 A1* 1/2020 Mohamad Abdul ........................ H04W 12/084
2020/0012527 A1* 1/2020 Hartsock ................... H04L 9/14
2020/0034160 A1* 1/2020 Koren ..................... H04L 67/10
2020/0036601 A1* 1/2020 Wang .................. G06F 9/45558
2020/0058091 A1* 2/2020 Dcosta .................... G06F 16/27
2020/0076917 A1* 3/2020 Sutardja .................. H04L 67/06
2020/0084187 A1* 3/2020 Bouaziz .................. G06F 21/82
2020/0084202 A1* 3/2020 Smith ..................... H04W 12/08
2020/0125700 A1* 4/2020 Chang ................. G06F 21/6218
2020/0127980 A1* 4/2020 Smith ................... H04L 67/141
2020/0134207 A1* 4/2020 Doshi ................... H04L 9/0822
2020/0204463 A1* 6/2020 Guan .................... G06F 21/604
2020/0228880 A1* 7/2020 Iyer ...................... H04N 21/251
2020/0242258 A1* 7/2020 Smith ..................... H04L 63/10
2020/0259896 A1* 8/2020 Sachs .................. H04L 63/0428
2020/0265062 A1* 8/2020 Srinivasan ............ G06F 9/4416
2020/0287915 A1* 9/2020 Neuvirth ............. H04L 63/1416
2020/0334304 A1* 10/2020 Reddy Vennapusa ........................ G06F 16/958
2020/0356670 A1* 11/2020 Cheng ..................... G06F 21/71
2020/0374284 A1* 11/2020 Suresh ................ H04L 63/0861
2020/0380160 A1* 12/2020 Kraus ................... G06F 21/577
2020/0412540 A1* 12/2020 Sabath ................. H04L 9/0866
2021/0006972 A1* 1/2021 Guim Bernat ...... H04W 12/041
2021/0011823 A1* 1/2021 Guim Bernat ...... G06F 9/44505
2021/0012282 A1* 1/2021 Smith ............... G06Q 10/0838
2021/0014047 A1* 1/2021 Guim Bernat ...... G06F 21/6218
2021/0014301 A1* 1/2021 Doshi ..................... H04L 67/10
2021/0021533 A1* 1/2021 Guim Bernat ........ H04L 47/746
2021/0021594 A1* 1/2021 Guim Bernat ........ H04L 63/105
2021/0021609 A1* 1/2021 Smith ..................... H04L 45/72
2021/0044646 A1* 2/2021 Guim Bernat ...... H04L 67/5682
2021/0081271 A1* 3/2021 Doshi ................. G06F 11/3476
2021/0089685 A1* 3/2021 Cheruvu ................. G06F 21/54
2021/0110310 A1* 4/2021 Guim Bernat ......... G06N 20/00
2021/0112138 A1* 4/2021 Eberlein ............... G06F 16/211
2021/0117246 A1* 4/2021 Lal ........................ G06F 9/3814
2021/0117249 A1* 4/2021 Doshi ................... G06F 9/5077
2021/0117515 A1* 4/2021 Bartfai-Walcott .......................... H04L 63/0823
2021/0117578 A1* 4/2021 Cheruvu ................. G06F 21/85
2021/0117697 A1* 4/2021 Guim Bernat ....... G08G 1/0133
2021/0133298 A1* 5/2021 Andrews ................. G06F 21/53
2021/0135864 A1* 5/2021 Salmela ................ H04L 9/3247
2021/0135943 A1* 5/2021 Andrews ............... H04L 67/131
2021/0136082 A1* 5/2021 Andrews ............... H04L 63/105
2021/0136115 A1* 5/2021 Andrews ............. H04L 63/1433
2021/0141930 A1* 5/2021 Aziz .................. G06F 21/6245
2021/0144202 A1* 5/2021 Maciocco ........... H04L 67/1051
2021/0144517 A1* 5/2021 Guim Bernat ...... H04L 41/0843
2021/0152543 A1* 5/2021 Doshi .................... G06N 20/00
2021/0157848 A1* 5/2021 Doshi ................. G06F 16/9014
2021/0173710 A1* 6/2021 Crossley ............ G06F 9/45558
2021/0216612 A1* 7/2021 Wojcik .................. H04L 9/3247
2021/0217001 A1* 7/2021 Harrison ................... H04L 9/50
2021/0226951 A1* 7/2021 Goldstein ........... H04L 63/0884
2021/0234864 A1* 7/2021 Dube .................. H04L 63/0884
2021/0234898 A1* 7/2021 Desai ................... H04L 63/104
2021/0240818 A1* 8/2021 Seksenov .............. G06F 16/986
2021/0263779 A1* 8/2021 Haghighat ............ G06F 9/5061
2021/0266303 A1* 8/2021 Pollutro .............. H04L 63/0435
2021/0281581 A1* 9/2021 Atighetchi .......... H04W 12/088
2021/0286861 A1* 9/2021 Churchill ................ G06F 21/31
2021/0289001 A1* 9/2021 Wilson .................. H04L 63/101
2021/0306227 A1* 9/2021 Atighetchi ............ H04L 63/107
2021/0314342 A1* 10/2021 Oberg ..................... H04L 63/20
2021/0314365 A1* 10/2021 Smith ................... G06F 11/301
2021/0326763 A1* 10/2021 Bernat .................. H04L 9/3236
2021/0328783 A1* 10/2021 Doshi ................... H04L 9/0861
2021/0385129 A1* 12/2021 Shadbolt ................. H04L 63/20
2022/0012042 A1* 1/2022 Doshi ..................... H04L 43/50
2022/0012045 A1* 1/2022 Rudraraju ................. G06F 8/36
2022/0012095 A1* 1/2022 Ylinen .................. G06F 9/5044
2022/0014422 A1* 1/2022 Gupta Hyde ......... H04L 41/145
2022/0014450 A1* 1/2022 Srikanteswara ........ G06F 16/00
2022/0014462 A1* 1/2022 Feng .................. H04W 40/026
2022/0014466 A1* 1/2022 Doshi ................. H04L 63/0471
2022/0014566 A1* 1/2022 Guim Bernat ........ H04L 63/205
2022/0014923 A1* 1/2022 Banjade ................... H04K 3/22
2022/0014947 A1* 1/2022 Smith ................... H04W 24/04
2022/0019366 A1* 1/2022 Freilich ............... G06F 21/6218
2022/0019367 A1* 1/2022 Freilich ................... G06F 3/067
2022/0038449 A1* 2/2022 Tripp ...................... H04L 67/02
2022/0038554 A1* 2/2022 Merwaday ............. H04L 67/63
2022/0070267 A1* 3/2022 McCall ................... H04L 67/51
2022/0078209 A1* 3/2022 V .......................... H04L 63/105
2022/0083383 A1* 3/2022 Ylinen .................. G06F 9/4843
2022/0085976 A1* 3/2022 Fan .................... H04L 63/0807
2022/0086218 A1* 3/2022 Sabella ................. H04M 15/66
2022/0094690 A1* 3/2022 Tarkhanyan ............ G06F 9/505
2022/0103714 A1* 3/2022 Ota .................... H04N 1/00188
2022/0114251 A1* 4/2022 Guim Bernat ........ G06F 21/577
2022/0116335 A1* 4/2022 Sharma Banjade .. H04W 24/02
2022/0116384 A1* 4/2022 Bartsch ................... H04L 63/20
2022/0116445 A1* 4/2022 Filippou ............. H04L 41/0806
2022/0116455 A1* 4/2022 Raghunath .......... H04L 67/1097
2022/0116755 A1* 4/2022 Filippou ................. H04L 67/51
2022/0121470 A1* 4/2022 Saxena ................... H04L 63/20
2022/0141015 A1* 5/2022 Fong ......................... H04L 9/14 713/171
2022/0141026 A1* 5/2022 Smith ................... H04L 9/3263 713/181
2022/0141201 A1* 5/2022 Lal ...................... H04L 63/1475
2022/0150125 A1* 5/2022 Kumar ................... G06N 20/00
2022/0159010 A1* 5/2022 Bandarupalli .......... G06F 21/62
2022/0171648 A1* 6/2022 Rodriguez .......... G06F 9/45533
2022/0191648 A1* 6/2022 Smith ................ G06F 11/3089
2022/0197773 A1* 6/2022 Butler ................ H04N 21/2223
2022/0200806 A1* 6/2022 Grobelny .............. H04L 9/0897
2022/0200950 A1* 6/2022 Sekar .................... H04W 12/06
2022/0200989 A1* 6/2022 Andrews ............. H04L 63/0876
2022/0201044 A1* 6/2022 Willis ..................... H04L 63/20
2022/0201073 A1* 6/2022 Mallikarjuna Durga Lokanath .... G06F 9/5077
2022/0206772 A1* 6/2022 Akiona ................... H04L 47/12

(56) References Cited

U.S. PATENT DOCUMENTS

2022/0206958 A1* 6/2022 LeMay ............... G06F 12/0831
2022/0210141 A1* 6/2022 Parekh ............... H04L 63/08
2022/0210643 A1* 6/2022 Hynds ............... G06F 21/45
2022/0231964 A1* 7/2022 Alam ............... H04L 47/74
2022/0237202 A1* 7/2022 Orun ............... G06F 16/254
2022/0239698 A1* 7/2022 Anantharaju ......... H04L 63/105
2022/0255916 A1* 8/2022 Smith ............... H04L 9/3247
2022/0321566 A1* 10/2022 Coyle ............... H04L 63/101
2022/0329576 A1* 10/2022 Nikam ............... H04L 63/0272
2022/0337590 A1* 10/2022 Jaiswal ............... H04L 63/0815
2022/0345417 A1* 10/2022 Kasichainula .......... H04L 47/30
2022/0345490 A1* 10/2022 Wu ............... H04L 67/10
2022/0357975 A1* 11/2022 Huang ............... G06F 9/45545
2022/0360448 A1* 11/2022 Sahni ............... H04L 63/0846
2022/0382539 A1* 12/2022 Gumashta .............. G06N 20/00
2022/0391494 A1* 12/2022 Yang ............... G06F 21/6209
2022/0407861 A1* 12/2022 Beecham ............... H04L 63/08
2022/0417117 A1* 12/2022 Tayeb ............... H04L 41/28
2023/0006889 A1* 1/2023 Thyagaturu ......... H04L 41/5054
2023/0007483 A1* 1/2023 Mueck ............... H04W 12/069
2023/0014064 A1* 1/2023 Cheruvu ............... H04L 63/101
2023/0015829 A1* 1/2023 Hyde ............... H04W 40/28
2023/0018191 A1* 1/2023 Moustafa ............ H04L 67/1095
2023/0027152 A1* 1/2023 Doshi ............... H04L 41/0672
2023/0045110 A1* 2/2023 Ranganathan .......... G06F 21/53
2023/0068386 A1* 3/2023 Akdeniz ............... G06N 20/00
2023/0086899 A1* 3/2023 Sharma Banjade .. H04W 16/14 455/515
2023/0090190 A1* 3/2023 Iila ............... G06F 21/53 726/1
2023/0097521 A1* 3/2023 Tammana ............... H04L 63/20 726/7
2023/0101303 A1* 3/2023 Tammana ........... H04L 63/0815 726/8
2023/0106268 A1* 4/2023 Venkatesh .......... G01C 21/3856 701/23
2023/0110080 A1* 4/2023 Hen ............... H04L 63/105 726/4
2023/0124265 A1* 4/2023 Crowley ............... H04L 63/104 726/27
2023/0131060 A1* 4/2023 Ko ............... H04L 9/3213 713/151
2023/0134546 A1* 5/2023 Gopalakrishnan ..... G06N 20/20 726/23
2023/0135938 A1* 5/2023 Carranza ............... H04L 67/10 709/238
2023/0140252 A1* 5/2023 Carranza ............. H04L 41/0889 726/6
2023/0153150 A1* 5/2023 Kozlowski ............. H04L 63/20 718/108
2023/0155984 A1* 5/2023 Adam ............... H04L 63/105 726/26
2023/0164241 A1* 5/2023 Filippou ............... H04L 63/08 709/201
2023/0177349 A1* 6/2023 Balakrishnan ......... G06N 3/084 706/25
2023/0179425 A1* 6/2023 Brown ............... G06F 21/575 713/168
2023/0188516 A1* 6/2023 Danilov ............... G06F 9/5072 726/7
2023/0208828 A1* 6/2023 Kolodziej ........... H04L 63/0823 726/6
2023/0216849 A1* 7/2023 Smith ............... H04L 63/20 726/7
2023/0229458 A1* 7/2023 Andrews ............. G06F 9/44505 726/6
2023/0239301 A1* 7/2023 Ivanov ............... H04L 63/102 726/1
2023/0259412 A1* 8/2023 Xing ............... G06F 9/541 719/328
2023/0266957 A1* 8/2023 Ren ............... G06F 8/65 717/169
2023/0305895 A1* 9/2023 Doostnejad ......... G06F 9/45558
2023/0342478 A1* 10/2023 Ranganathan ...... G06F 9/45558
2023/0344804 A1* 10/2023 Thyagaturu ......... H04L 63/0428
2023/0344819 A1* 10/2023 Goodman ........... H04L 63/0442
2023/0344871 A1* 10/2023 Smith ............... H04L 67/60
2023/0376344 A1* 11/2023 Jutzi ............... G06F 9/45558
2023/0412611 A1* 12/2023 Gaffney ............... H04L 63/105
2023/0418969 A1* 12/2023 Hansmann ............ G06F 21/602
2023/0421253 A1* 12/2023 Palermo ............. H04B 7/18591
2023/0421567 A1* 12/2023 Gaffney ............... G06F 21/604
2024/0022550 A1* 1/2024 Raghuram ............ H04L 63/062
2024/0022609 A1* 1/2024 Smith ............... H04L 63/20
2024/0031373 A1* 1/2024 Gupta ............... H04L 63/102
2024/0053973 A1* 2/2024 Ranganathan ............ G06F 8/63
2024/0098095 A1* 3/2024 Ponsini ............... H04L 63/107
2024/0106839 A1* 3/2024 Smith ............... H04L 63/1441
2024/0111689 A1* 4/2024 Khaund ............... H04L 63/062
2024/0147404 A1* 5/2024 Sabella ............... H04L 67/289
2024/0154967 A1* 5/2024 McGuinness ......... G06F 21/604
2024/0154968 A1* 5/2024 Kwon ............... H04L 63/102
2024/0155025 A1* 5/2024 Akdeniz ............... G06N 3/084
2024/0160717 A1* 5/2024 Raghuram ............. G06F 21/33
2024/0205198 A1* 6/2024 Sood ............... H04L 63/0428
2024/0220109 A1* 7/2024 Bhatnagar ............... G06F 3/067
2024/0223384 A1* 7/2024 Guim Bernat ...... H04L 63/0823
2024/0223534 A1* 7/2024 Gu ............... H04L 63/0236
2024/0241960 A1* 7/2024 King ............... G06F 21/57
2024/0244045 A1* 7/2024 Grobelny ............... G06F 8/77
2024/0244051 A1* 7/2024 Dhoble ............... G06F 21/6218
2024/0248699 A1* 7/2024 Andrews ............ H04L 63/0838
2024/0250947 A1* 7/2024 Grobelny ............... H04L 63/08
2024/0250953 A1* 7/2024 Robison ............... H04L 63/20
2024/0250978 A1* 7/2024 Grobelny ............. H04L 63/107
2024/0275775 A1* 8/2024 Pourzandi ............ H04L 63/062
2024/0283784 A1* 8/2024 McCormick ........... H04L 63/20
2024/0283795 A1* 8/2024 McCormick ........ G06F 21/6218
2024/0291839 A1* 8/2024 Yagnik ............... H04L 51/214
2024/0312130 A1* 9/2024 Palermo ........... H04N 21/41407
2024/0314058 A1* 9/2024 Mueck ............... H04L 41/40
2024/0323034 A1* 9/2024 Kumar ............... H04L 9/3268
2024/0380610 A1* 11/2024 Andre ............... H04L 9/3263
2024/0388510 A1* 11/2024 Madtha ............... H04L 41/342
2024/0414086 A1* 12/2024 Lu ............... H04L 12/4641
2024/0414148 A1* 12/2024 Liu ............... H04L 63/083
2024/0430247 A1* 12/2024 Singh ............... H04L 63/08
2024/0430248 A1* 12/2024 Geimer ............... H04L 67/02
2025/0004639 A1* 1/2025 Sawal ............... G06F 3/0631
2025/0007895 A1* 1/2025 Duncan ............... H04L 9/3213
2025/0023714 A1* 1/2025 Kumar ............... H04L 9/0819
2025/0023855 A1* 1/2025 Goodman ............... H04L 63/08
2025/0024331 A1* 1/2025 Alasti ............... H04W 12/08
2025/0030561 A1* 1/2025 Long ............... H04L 9/3268
2025/0030676 A1* 1/2025 Uzun ............... H04L 63/0823
2025/0030699 A1* 1/2025 Suresh Puthalath .. H04L 63/108
2025/0055710 A1* 2/2025 Long ............... H04L 9/3268
2025/0080514 A1* 3/2025 Tomlin ............... H04L 63/068
2025/0088373 A1* 3/2025 Uzun ............... H04L 9/3268
2025/0088499 A1* 3/2025 Nair ............... H04L 63/104
2025/0088514 A1* 3/2025 Majeed ............... H04L 63/105
2025/0097211 A1* 3/2025 Uzun ............... H04L 63/0823
2025/0112926 A1* 4/2025 Bashir ............... H04L 63/102
2025/0119739 A1* 4/2025 Baranowsky ......... H04W 12/77
2025/0132931 A1* 4/2025 Chivers ............... H04L 63/102
2025/0139230 A1* 5/2025 Gong ............... G06F 21/53
2025/0181399 A1* 6/2025 Alrahem ............... G06F 21/33
2025/0184360 A1* 6/2025 Headley ............... H04L 63/10
2025/0233758 A1* 7/2025 Ponnuru ............... H04L 9/3265
2025/0238554 A1* 7/2025 Ponnuru ............... G06F 21/57
2025/0240293 A1* 7/2025 Ponnuru ............... H04L 63/08
2025/0259042 A1* 8/2025 Crabtree ............... G06N 3/047
2025/0259043 A1* 8/2025 Crabtree ............... G06N 3/047
2025/0259044 A1* 8/2025 Crabtree ............... G06N 3/042
2025/0259085 A1* 8/2025 Crabtree ............... G06N 5/043
2025/0323975 A1* 10/2025 Filippou ............... H04W 12/06
2025/0371141 A1* 12/2025 Vaughn ............... G06F 21/552
2025/0371225 A1* 12/2025 Lesnik ............... G06F 30/27
2025/0371426 A1* 12/2025 Fortkort ............... G06N 20/00
2025/0374058 A1* 12/2025 Palermo ............... H04W 12/63

(56) References Cited

U.S. PATENT DOCUMENTS

| | | | | |
|---|---|---|---|---|
| 2025/0390352 | A1* | 12/2025 | Crabtree | G06F 9/5027 |
| 2026/0046317 | A1* | 2/2026 | Crabtree | H04L 63/104 |
| 2026/0056907 | A1* | 2/2026 | Hyatt | G06F 13/4221 |

OTHER PUBLICATIONS

Zhou et al "Towards Confidential Computing: A Secure Cloud Architecture for Big Data Analytics and AI," IEEE, pp. 293-295 (Year: 2023).*

Bahrami et al "Compliance-Aware Provisioning of Containers on Cloud," IEEE Computer Society, pp. 696-700 (Year: 2017).*

Brasser et al "Trusted Container Extensions for Container-Based Confidential Computing," pp. 1-10 (Year: 2022).*

Lee et al "TEEMate: Fast and Efficient Confidential Container using Shared Enclave," pp. 1-15 (Year: 2024).*

Jauernig et al "Trusted Execution Environments: Properties, Applications and Challenges," pp. 56-60 (Year: 2020).*

Zhu et al "Enabling Rack-Scale Confidential Computing using Heterogenous Trusted Execution Environment," IEEE, pp. 1450-1465 (Year: 2020).*

* cited by examiner

MULTI-TENANT SECRETS MANAGER

FIELD OF THE INVENTION

Embodiments of the present invention generally relate to operations in a containerized workload environment. More particularly, at least some embodiments of the invention relate to systems, hardware, software, computer-readable media, and methods, for management of tenant secrets in a containerized workload management environment.

BACKGROUND

Security concerns remain a significant challenge for adopting and running containerized applications in Kubernetes. The State of Kubernetes Security Report, produced by Red Hat, analyzed survey data from over 500 IT and security decision-makers, indicated a significant trend. Specifically, the report revealed that 59% of respondents are most concerned with unaddressed security and compliance needs or threats to containers. This is particularly concerning in containerized workload environments that may have many tenants.

Poor secret management can lead to detrimental consequences, leaving companies susceptible to security breaches of all kinds. To make matters worse, one secret may, in some circumstances, be used to unlock resources that contain even more secrets.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
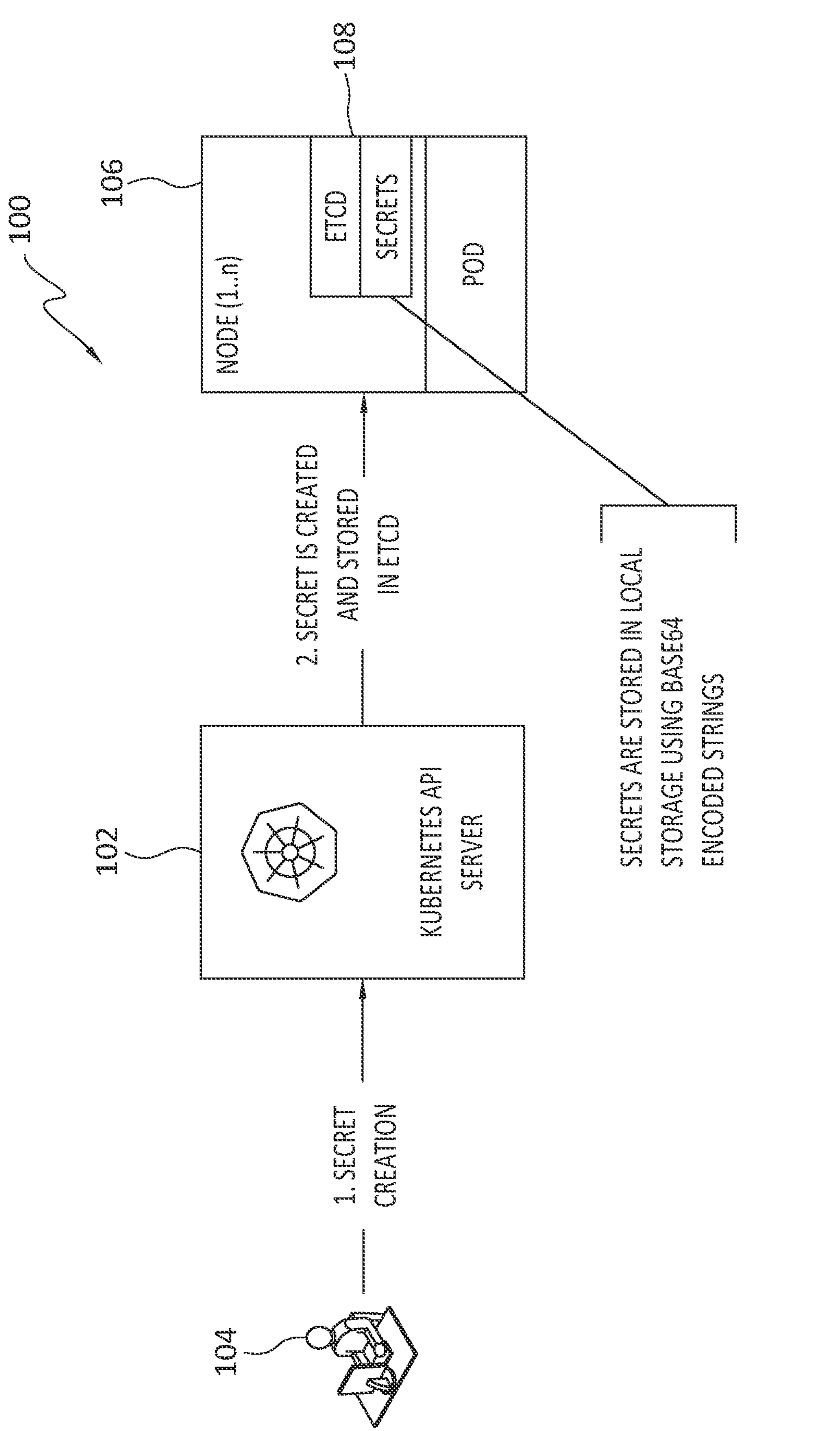
FIG. 1 discloses a hypothetical comparative example to illustrate a circumstance that may be addressed by an embodiment.

Embodiments of the present invention generally relate to operations in a containerized workload environment. More particularly, at least some embodiments of the invention relate to systems, hardware, software, computer-readable media, and methods, for management of tenant secrets in a containerized workload management environment.

One example embodiment comprises a method which may be performed in whole, or in part, by a multi-tenant secrets manager using a confidential container microservice. In an embodiment, the method may be performed in a containerized workload management environment, such as Kubernetes for example.

In an embodiment, the method may comprise the following operations: receiving a tenant request to access confidential services for use in provisioning services of the tenant; provisioning the identified tenant services; receiving, from the tenant, catalog information that may include, for example, tenant id, metadata, compute devices information, service tags, and security certificates; creating a tenant-specific catalog to store the catalog information; enabling the tenant to plugin to a cloud framework identified by the tenant; providing a secrets management service to the tenant with respect to a node, or nodes, identified by the tenant, so as to enable the tenant to construct, or request the construction of, a trusted execution environment; permitting access to the trusted execution environment, in accordance with information specified in the catalog; and, running a workload of the tenant in the trusted execution environment.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that a tenant need not rely on a workload management environment to manage security for the tenant. In an embodiment, a tenant may set up its own, customized, security for its containers in a workload management environment. Various other advantages of one or more example embodiments will be apparent from this disclosure.

A. Context for an Example Embodiment

With particular attention to FIG. 1, one example of an operating environment for embodiments of the invention is denoted generally at 100. This hypothetical example illustrates some potential concerns to which one or more embodiments may be directed.

The example environment 100, which may comprise a containerized workload management environment, may comprise a Kubernetes API (application program interface) server 102, configured to communicate with a tenant 104, and with one or more tenant nodes 106. In the case of Kubernetes, for example, each of the tenant nodes 106 may comprise an 'etcd' secrets store 108 in local storage. In operation, the tenant 104 may (1) create a secret which is then received the Kubernetes API server 102, and stored (2) in the secrets store 108. The tenant secret may be stored using, for example, base64 encoded strings generated by the Kubernetes API server 102. That is, Kubernetes stores sensitive data, such as the tenant secret, using the Secret object that is simply base64 encoded strings. As a result, anyone with API access, that is, access to the Kubernetes API server 102, can retrieve or modify a Secret. Moreover, by enabling the Kubernetes platform to encode the secret, the tenant has given up a measure of control over the security of its node(s).

B. Aspects of an Example Architecture

Protecting data in the cloud continues to gain importance and is challenging for both consumers, or tenants, and the cloud service provider. Thus, one example embodiment comprises an architecture 200 as disclosed in FIG. 2. In an embodiment, the architecture 200 may comprise a Dell APEX architecture and environment, and associated entities, but that is not required.

Figure 2:
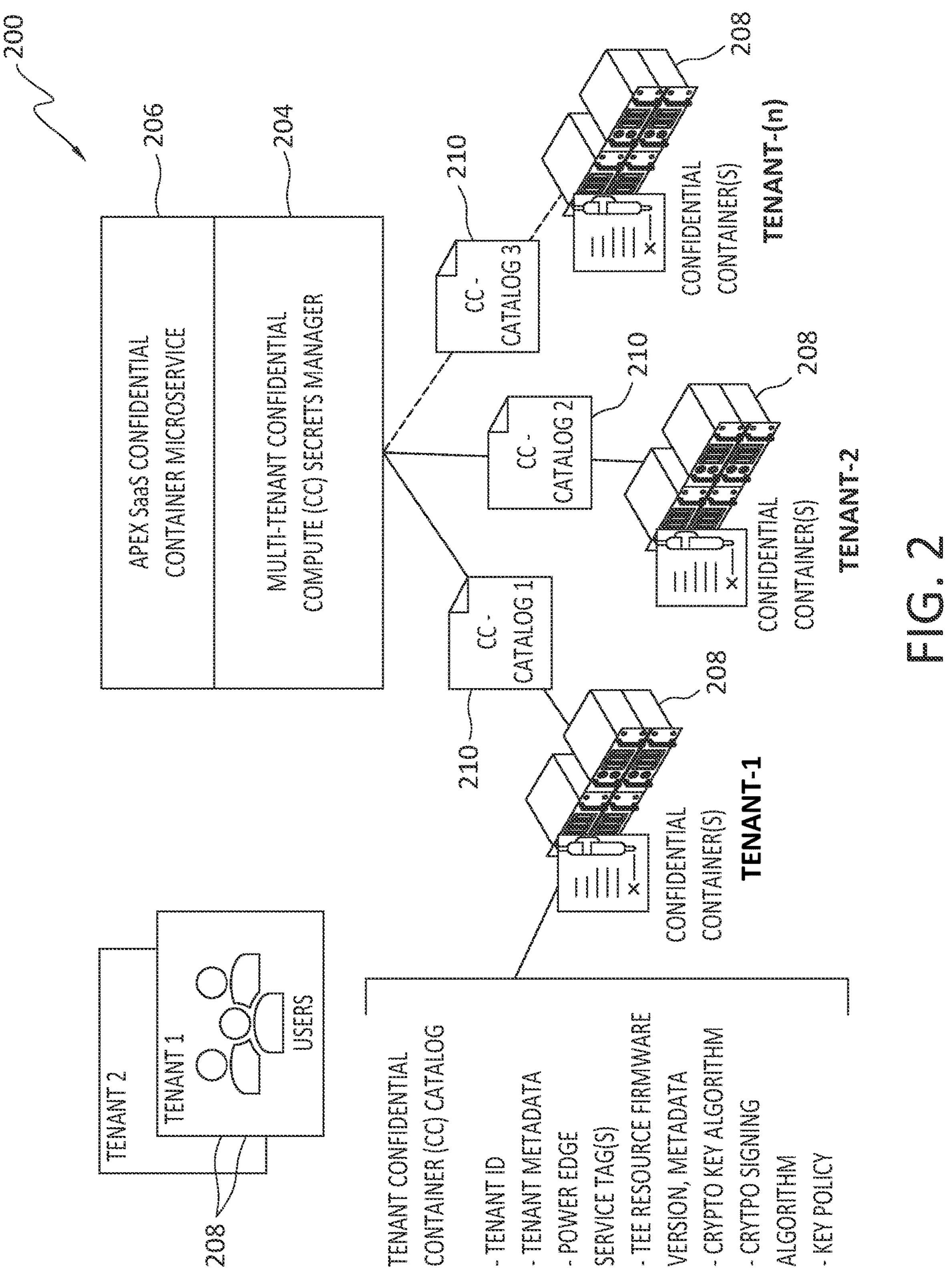
FIG. 2 discloses aspects of an architecture according to an embodiment.

As shown in FIG. 2, the architecture 200 may comprise a multi-tenant confidential compute (CC) secrets manager, or 'secrets manager,' 204 running a confidential container microservice (CCM) 206. The CCM 206 may be made available to one or more tenants 208. The secrets manager 204 may generate a respective, tenant-specific, CC catalogue 210 for each of the tenants 208. Information, such as security information, included in the CC catalogues 210 may be provided by the respective tenants 208. In general, such information, some, or all, of which may be tenant-specific, may comprise materials that the tenant 208 has deemed necessary to ensure the security of its nodes, or containers, in the architecture 200. For example, such information may include, but is not limited to, tenant id, tenant metadata, Dell PowerEdge service tags, TEE (trusted execution environment) resource firmware version and metadata, crypto key algorithms, crypto signing algorithms, and key policies. With this security information, a tenant 208 may be able to set up its own security parameters to control access to its containers and other information. Moreover, the use of a catalogs 210 may enable the tenant 208 to change or update its security requirements and policies at any time, and possibly automatically, such as after a specified time interval has passed, for example.

Thus, an embodiment may comprise a cloud managed confidential containerized method to shield tenant clusters against security attack vectors and to ensure that only an authorized tenant has access to the tenant confidential data and TEE resource lifecycle. In more detail, one particular embodiment may comprise a cloud-managed, such as by Dell APEX for example, tenant-specific confidential resource catalog which contains the tenant cluster configuration details such as, TEE resource discovery, provisioning and subscription licenses and resource shared policies, for multiple tenants or private use, for security isolations, crypto algorithms and crypto key policies. Another embodiment may comprise simplified, possibly Dell APEX, cloud tenant confidential cluster secrets management of TEE resources, such as security update, configurations updates, crypto key management policies, by way of controlled, possibly by Dell APEX, configuration update management.

C. Example Methods

It is noted with respect to the disclosed methods that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 3:
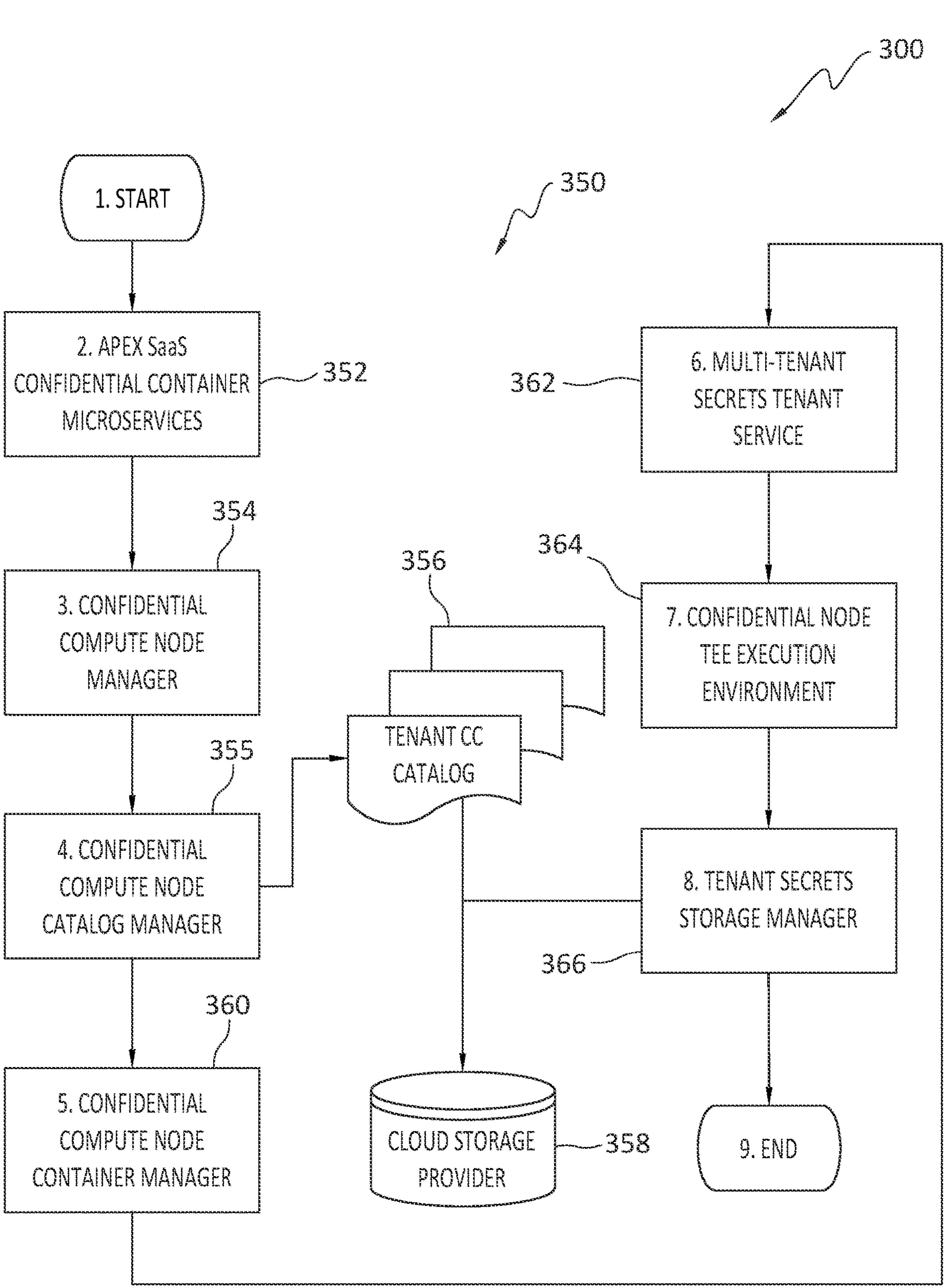
FIG. 3 discloses a method according to an embodiment.

Directing attention now to FIG. 3, aspects of an example method 300, and an associated group of entities 350, are disclosed. In an embodiment, the group of entities 350 may collectively define and implement a multi-tenant secrets manager. In general, the example method 300 comprises end-to-end message flows that enable the secure secrets manager capabilities for a multi-tenant architecture using confidential cloud container technologies.

The example method 300, any part(s), or all, of which may be provided as-a-Service (aaS) to one or more tenants, may begin when a tenant logs into (1) a cloud infrastructure management self-service portal, such as a Dell APEX portal for example. The tenant may then leverage (2) SaaS confidential container services 352, such as those provided by Dell APEX for example, for provisioning the tenant services. A CC node manager 354 may then implement (3) resource provisioning using a multi-tenant TEE attested resource provisioning method.

A CC node catalog manager 355 may, for example, provide (4) tenant services to store and manage tenant catalog 356 information that may include tenant id, metadata, PowerEdge compute devices, service tags and security certificates, for example. The tenant catalog(s) 356 may be stored in a cloud storage provider database 358, accessible by the tenant(s), for configuration management purposes, and/or other purposes.

Next, a confidential compute node container manager 360 may provide (5) cloud management service plugins to various cloud frameworks, such as cloud frameworks implemented in public clouds. Such cloud frameworks, or cloud infrastructures, may comprise frameworks for managing containerized workloads executed in a cloud environment, and may comprise frameworks such as Kubernetes, and Docker, for example.

A multi-tenant secrets tenant service, or manager, 362 may provide (6) tenant secrets management services to one or more tenants. The tenant secrets management services may be implemented as provided by tenant-specific confidential compute technology guidelines, possibly stored in the tenant catalog 356, on/for the specific confidential tenant nodes.

Next, the tenant secrets manager 363 may use (7), possibly in connection with the execution of a tenant workload, a confidential tenant node TEE 364 for processing and computing sensitive information/data in a TCB (trusted computing base). A tenant secrets storage manager 366 may store (8), such as in the cloud storage provider database 358, tenant secrets cipher information may be stored in an external, that is, public, cloud storage environment. Finally, this instance of the example method 300 may terminate (9).

D. Further Discussion

As apparent from this disclosure, an embodiment may possess various useful features and aspects, although no embodiment is required to possess any of such features or aspects. The following examples are illustrative. An embodiment may comprise a cloud-managed, tenant-specific, confidential resource catalog which contains the tenant cluster configuration details such as, for example, TEE resource discovery, provisioning and subscription licenses and resource shared policies, for multiple tenants or private use, for security isolations, crypto algorithms, and crypto key policies. As another example, and embodiment may comprise cloud tenant confidential cluster secrets management of TEE resources, such as security update, configurations updates, crypto key management policies, by way of controlled configuration update management. Thus, an embodiment may provide seamless security trust, and OEM (original equipment manufacturer) certified node configuration management.

E. Further Example Embodiments

Following are some further example embodiments of the invention. These are presented only by way of example and are not intended to limit the scope of the invention in any way.

Embodiment 1. A method, comprising: receiving, by a confidential container service from a tenant, a request to provision a tenant node; provisioning the tenant node using a multi-tenant trusted execution environment (TEE) attested resource provisioning process; receiving, from the tenant, tenant-specific security information concerning the tenant node; storing the tenant-specific security information in a tenant-specific catalog; implementing security procedures, specified in the tenant-specific security information, in the tenant node; and upon successful authentication of the tenant, using the security procedures, enabling the tenant to access tenant specific confidential resources from the tenant node.

Embodiment 2. The method as recited in any preceding embodiment, further comprising receiving, from the tenant, a change to the tenant-specific security information.

Embodiment 3. The method as recited in embodiment 2, further comprising updating the tenant-specific catalog with the change.

Embodiment 4. The method as recited in any preceding embodiment, wherein a cloud management service plugin to a cloud framework is provided to the tenant by a confidential compute node container manager.

Embodiment 5. The method as recited in any preceding embodiment, wherein the tenant-specific security information comprises any one or more of: tenant id; tenant metadata; tenant service tag; or tenant security certificate.

Embodiment 6. The method as recited in any preceding embodiment, wherein the tenant-specific catalog is stored at a cloud site that includes the tenant node.

Embodiment 7. The method as recited in any preceding embodiment, wherein the tenant-specific catalog is provided by a confidential compute node catalog manager.

Embodiment 8. The method as recited in any preceding embodiment, wherein the provisioning, the storing, and the implementing, are all provided as-as-Service to the tenant.

Embodiment 9. The method as recited in any preceding embodiment, wherein when the tenant is authenticated, running a tenant workload on the tenant node.

Embodiment 10. The method as recited in embodiment 9, wherein the tenant workload is a containerized workload implemented using a containerized workload management system.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments, which may be remote or on-prem, where one or more of a client, server, or other machine may reside and operate in a cloud environment.

Figure 4:
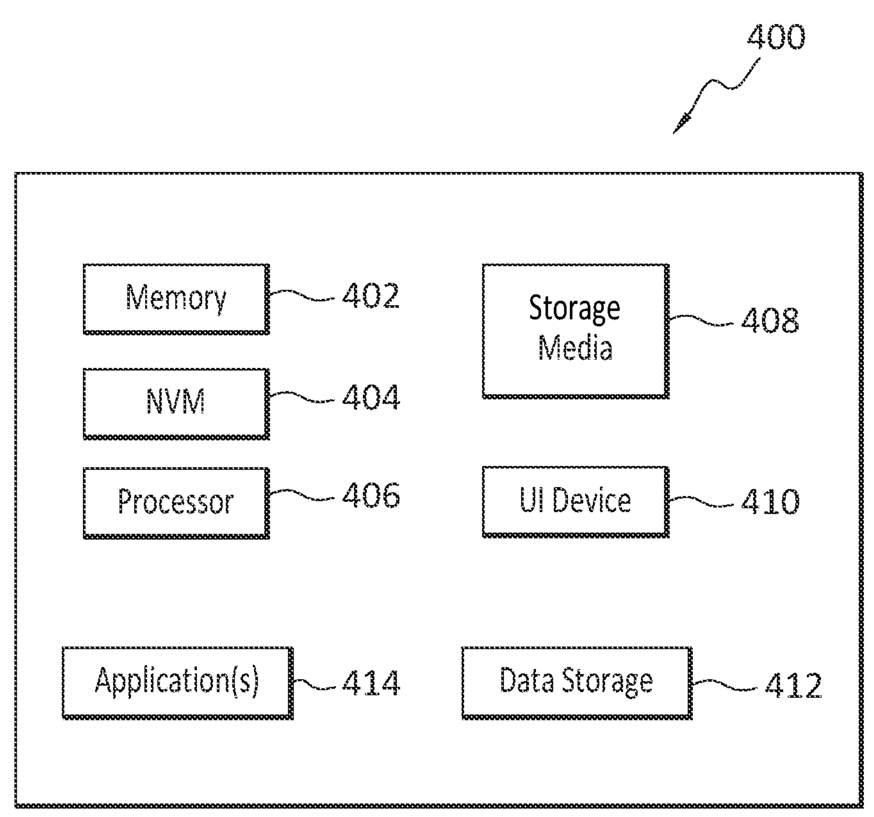
FIG. 4 discloses a computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving, by a confidential container service from each tenant among a plurality of tenants, a request to provision a respective confidential container, which is tenant-specific;

provisioning the respective confidential container using a multi-tenant trusted execution environment (TEE) attested resource provisioning process;

receiving, from the tenant, tenant-specific security information comprising security procedures and cryptographic policies associated with the respective confidential container;

storing the tenant-specific security information in a tenant-specific catalog; implementing, within the respective confidential container, the security procedures based on the tenant-specific catalog, such that the security procedures control access to tenant-specific confidential resources within the TEE during execution of a tenant workload, wherein the security procedures are implemented within the confidential container as part of the TEE attested resource provisioning process;

upon successful authentication of the tenant, permitting access to the tenant-specific confidential resources in accordance with the security procedures specified in the tenant-specific catalog;

wherein the security procedures implemented within the trusted execution environment are controlled by the tenant-specific catalog and isolated from other tenants and a service provider; and wherein the tenant-specific catalog comprises TEE resource discovery, provisioning and subscription licenses and resource shared policies, crypto algorithms, and crypto key policies that dynamically control a runtime behavior of the security procedures within the confidential container, wherein the tenant-specific security information comprises any one or more of: tenant id; tenant metadata; tenant service tag; or tenant security certificate, wherein the tenant-specific catalog is stored at a cloud site that includes the respective confidential container, wherein the provisioning, the storing, and the implementing, are all provided as a Software-as-a-Service to the tenant.

2. The method as recited in claim 1, further comprising receiving, from the tenant, a change to the tenant-specific security information.

3. The method as recited in claim 2, further comprising updating the tenant-specific catalog with the change.

4. The method as recited in claim 1, wherein a cloud management service plugin to a cloud framework is provided to the tenant by a confidential compute node container manager.

5. The method as recited in claim 1, wherein the tenant-specific catalog is provided by a confidential compute node catalog manager.

6. The method as recited in claim 1, wherein when the tenant is authenticated, running a tenant workload on the respective confidential container.

7. The method as recited in claim 6, wherein the tenant workload is a containerized workload implemented using a containerized workload management system.

8. A non-transitory storage medium having stored therein instructions that are executable by one or more hardware processors to perform operations comprising:

receiving, by a confidential container service from each tenant among a plurality of tenants, a request to provision a respective confidential container, which is tenant-specific;

provisioning the respective confidential container using a multi-tenant trusted execution environment (TEE) attested resource provisioning process;

receiving, from the tenant, tenant-specific security information comprising security procedures and cryptographic policies associated with the respective confidential container;

storing the tenant-specific security information in a tenant-specific catalog; implementing, within the respective confidential container, the security procedures based on the tenant-specific catalog, such that the security procedures control access to tenant-specific confidential resources within the TEE during execution of a tenant workload, wherein the security procedures are implemented within the confidential container as part of the TEE attested resource provisioning process;

upon successful authentication of the tenant, permitting access to the tenant-specific confidential resources in accordance with the security procedures specified in the tenant-specific catalog;

wherein the security procedures implemented within the trusted execution environment are controlled by the tenant-specific catalog and isolated from other tenants and a service provider; and wherein the tenant-specific catalog comprises TEE resource discovery, provisioning and subscription licenses and resource shared policies, crypto algorithms, and crypto key policies that dynamically control a runtime behavior of the security procedures within the confidential container, wherein the tenant-specific security information comprises any one or more of: tenant id; tenant metadata; tenant service tag; or tenant security certificate, wherein the tenant-specific catalog is stored at a cloud site that includes the respective confidential container, wherein the provisioning, the storing, and the implementing, are all provided as a Software-as-a-Service to the tenant.

9. The non-transitory storage medium as recited in claim 8, further comprising receiving, from the tenant, a change to the tenant-specific security information.

10. The non-transitory storage medium as recited in claim 9, further comprising updating the tenant-specific catalog with the change.

11. The non-transitory storage medium as recited in claim 8, wherein a cloud management service plugin to a cloud framework is provided to the tenant by a confidential compute node container manager.

12. The non-transitory storage medium as recited in claim 8, wherein the tenant-specific catalog is provided by a confidential compute node catalog manager.

13. The non-transitory storage medium as recited in claim 8, wherein when the tenant is authenticated, running a tenant workload on the respective confidential container.

14. The non-transitory storage medium as recited in claim 13, wherein the tenant workload is a containerized workload implemented using a containerized workload management system.

* * * * *